April 7, 1970  W. J. LOVE  3,504,953
FOIL BEARING
Filed Aug. 29, 1968

Inventor:
William J. Love,
by
His Attorney.

United States Patent Office 3,504,953
Patented Apr. 7, 1970

3,504,953
FOIL BEARING
William J. Love, Schenectady, N.Y., assignor to General Electric Company, a corporation of New York
Filed Aug. 29, 1968, Ser. No. 756,195
Int. Cl. F16c 13/04, 17/16
U.S. Cl. 308—15                                    10 Claims

ABSTRACT OF THE DISCLOSURE

In a foil bearing assembly a plurality of foil members is provided, each having a central bearing portion and a pair of end portions, the end portions being in the form of a plurality of strips. The end portions of the foil members are secured at circumferentially spaced points on a support structure so that the central portion of each foil member provides a support surface for a respective portion of the journal. The end portions of the foil are formed and foil members are axially disposed so that the strips of an end portion of a member are interleaved with the strips of an end portion of a circumferentially adjacent member.

---

The present invention relates to shaft bearings and more particularly to such bearings in which foil members are the supporting elements.

Shafts supported by foil bearings have particular merit in minimizing shaft whirl and other nonlinear instabilities. However, in such bearings, problems arise in connection with the supporting of the foil members thereof, particularly where a good degree of peripheral and axial support of the journal is required.

Accordingly, a principal object of the present invention is to provide a foil bearing of any desired axial extent and which is not limited by tension requirements.

Another object of the present invention is to provide a foil bearing which is simple in construction and easy to manufacture.

A further object of the present invention is to provide a foil bearing which permits ready adjustment and control of the precise fluid film thicknesses usually required in such bearings.

In accordance with an illustrative embodiment of the present invention, there is provided a plurality of foil supporting members. Each member includes a continuous central bearing portion and a pair of end portions. The end portions are in the form of a plurality of spaced strips. Each of the foil members is adjustably secured at its ends to circumferentially spaced points on a supporting structure surrounding the journal to be supported. The pairs of points at which each of the foils are supported are distributed about the supporting structure so that different sections of the journal are supported by different members. The end portions of the foil members are formed and the foil members are axially disposed so that the strips of an end portion of a member are interleaved with the strips of an end portion of a circumferentially adjacent member.

The novel features which are believed to be characteristic of the present invention are set forth in the appended claims. The invention itself, however, together with further objects and advantages thereof may best be understood by reference to the following description taken in connection with the accompanying drawings in which:

Figure 1:
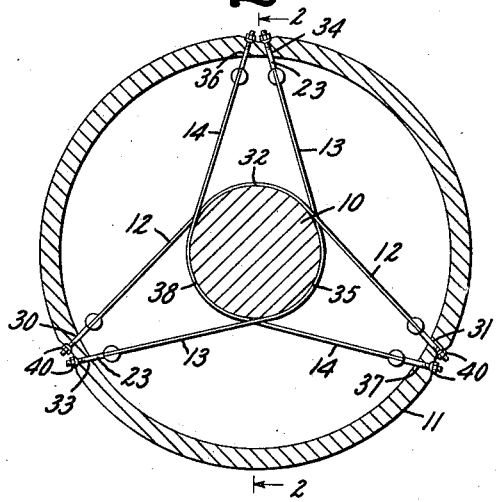
FIGURE 1 is an end view of the foil bearing assembly in accordance with an illustrative embodiment of the present invention.
Figure 2:
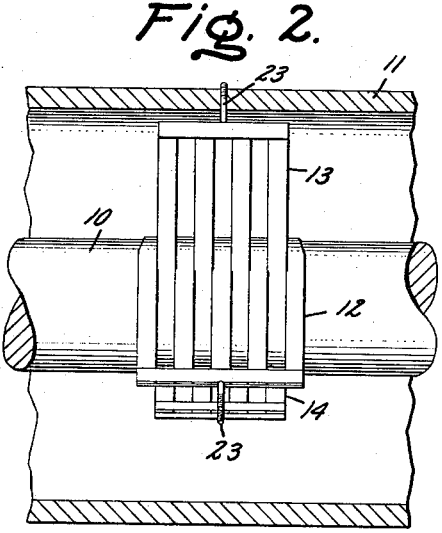
FIGURE 2 is a side view in section taken along section lines 2—2 of FIGURE 1.
Figure 3:
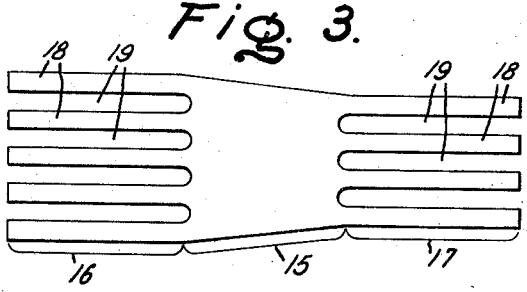
FIGURE 3 is a developed view of one of the foil members of the assemblies of FIGURES 1 and 2.

Referring now to FIGURES 1 and 2 there is shown a foil bearing assembly for supporting the journal 10 of a shaft including a supporting structure 11 surrounding the journal 10 and three foil bearing members 12, 13 and 14. Each of the foil members has an outline such as shown in the developed view of FIGURE 3 which shows a continuous central portion 15 providing the bearing surface for the journal 10 and a pair of end portions 16 and 17. Each of the end portions are in the form of a plurality of strips 18, each strip being spaced from an adjacent strip in an end portion by a distance equal to the width of a strip. The strips of end portion 17 are aligned with the spaces 19 of end portion 16.

Figure 4:
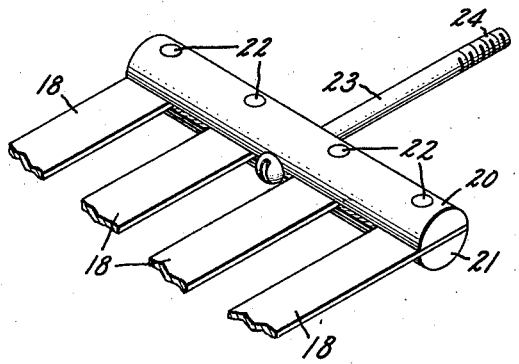
FIGURE 4 is a perspective view showing means for securing and end portion of the foil of FIGURE 3 to the bearing support structure illustrated in FIGURE 1.

FIGURE 4 shows a manner in which each of the end portions of the foil members 12, 13 and 14 are secured to the bearing support structure 11. This is intended to demonstrate a means of support and connection of the foil ends, but the invention itself is not limited to this specific means. A pair of clamping members 20 and 21 extend across strips 18 and are secured thereto by rivets 22. A bolt 23 extends through a central region of the clamps in the direction of orientation of the strips 18. The bolts on the end portions of a foil member are longitudinally aligned. The free end 24 of the bolt 23 is threaded to permit fastening to the support structure 11 as will be explained in connection with FIGURES 1 and 2 to which now reference is again made.

A pair of holes 30 and 31 is provided in the support structure 11. The holes are spaced slightly greater than 120° apart but at axially identical locations for receiving the bolts of the end portions of the foil member 12. The central portion and end portions of foil member 12 are of such length as to provide a concave bearing portion 32 subtending a solid angle of about 120° at the axis of rotation of the journal 10. Another pair of holes 33 and 34 is provided in the support structure 11. Holes 33 and 34 are spaced slightly greater than 120° apart but at axially identical locations for receiving the bolts of the end portions of foil member 13. The holes 33 and 34 are displaced 120° about the periphery of the structure 11 from holes 31 and 32 to dispose the central portion of member 13 to support a different portion of the journal 10. The end and central portions of the foil bearing member 13 are proportioned such that the central portion provides a concave bearing surface 35 subtending a solid angle of approximately 120° at the axis of rotation of the journal 10. A third set of holes 36 and 37 is provided in the support structure 11 for receiving the bolts of the end portions of foil bearing member 14. The holes 36 and 37 are at the same axial location but displaced apart by slightly greater than 120°. The holes 33 and 34 are displaced approximately 120° along the periphery of the structure 11 from holes 31 and 32 and from holes 33 and 34 to dispose the central portion of member 13 to support a different portion of the journal than supported by members 12 and 13. The end and central portions of the foil bearing member 14 are proportional such that the central portion provides a concave bearing surface 38 subtending a solid angle of approximately 120° at the axis of rotation of the journal. The set of holes for receiving the end bolts of foil members 12, 13 and 14 in the embodiment of FIGURES 1 and 2 are at the same axial location. To space the holes receiving the bolts of the pair of end portions of a member exactly 120° apart for each of the foil members would have the holes for adjacent end bolts coinciding. Accordingly, should it be desired to provide completely independent adjustment for each of the end portion of the foil members, a bolt having a U-shaped terminal and holes to match in the support structure 11 could be provided. In the alternative, the adjacent end portions of a pair of members could be secured to a common supporting bolt. Such disposition of the supporting holes for the foil members 12, 13 and 14 as described above enable the strip portions of adjacent end portions of the foil members to be interleaved. Strips for an end portion of one kind, for example end portion 16, of member 12 and the strips of the circumferentially adjacent end portion of the opposite kind, for example end portion 17, of member 14 are interleaved. Similarly, the other end portion of member 12 interleaves with an end portion of strip 13. Similarly, the remaining end portions of strips 13 and 14 are interleaved. The bolts of the end portions are secured in place by means of nuts 40 having a hemispherical bearing surface which bears against hemispherical recessed portions in the outer surface of the support cylinder 11.

In the assembly of the foil bearing, the shaft journal 10 may be held in aligned relationship with respect to the cylindrical support structure 11. The foil bearing members 12, 13 and 14 are assembled as shown in FIGURES 1 and 2. The individual foil members are secured to the desired degree of tension by adjustment of tension in the bolts 23.

Figure 5:
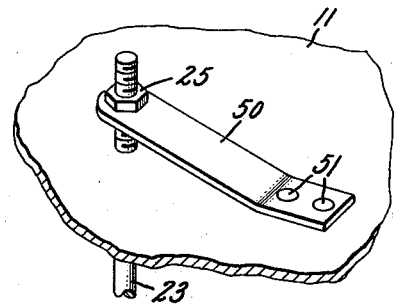
FIGURE 5 is a perspective view of a modification of the means for securing the end portions of the foil members of FIGURE 3 to the bearing support structure.

Should it be desirable to provide spring tension in the foil members an assembly such as shown in FIGURE 5 may be utilized. This figure shows a perspective view of the manner of providing spring tension at each end of the foil members 12, 13 and 14. A leaf spring 50 is secured at one end thereof by rivets 51 to the cylindrical support member 11. The other end of the spring 50 is spaced from the support 11 and has a hole therein for receiving bolt 23. The bolt is connected to the end portion by means of a nut 25, the adjustment of the position of which on the bolt adjusts the amount of tension applied to the foil bearing member.

In the illustrative embodiments of FIGURES 1 and 2, a three foil member assembly has been shown and described. It will be appreciated that, if desired, a larger or smaller number of foil members may be provided, for example, two, four and five foil members. In the illustrative embodiment of FIGURES 1 and 2 the entire journal surface has been shown as encompassed by the active or continuous area of the foil members. By suitable spacing the support holes for each of the foil members, the amount of surface area of the journal bearing encompassed by a member may be decreased, if desired. Also, while the foil members have been shown in symmetric array they may be located asymmetrically as well.

Figure 6:
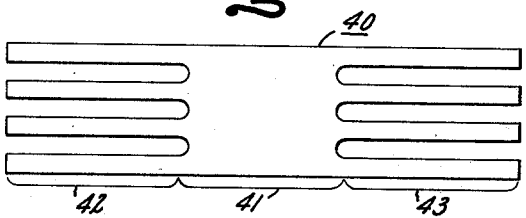
FIGURE 6 is a developed view of another embodiment of a foil member useful in accordance with the present invention.

Referring now to FIGURE 6 there is shown another embodiment of a foil member in accordance with the present invention. The foil member 40 is similar to the foil member of FIGURE 3 and has a central portion 41 and a pair of end portions 42 and 43. The central portion 41 is continuous and provides the bearing surface for the journal 10. Each of the end portions are in the form of a plurality of strips, each strip being spaced from an adjacent strip in an end portion by a distance equal to the width of a strip. However, each of the end portions 42 and 43 are identical and the strips in one of the end portions line up longitudinally with the strips in the other end portion. Foil members of the kind illustrated in FIGURE 6 would be particularly suited for bearing assemblies which required an even number of foil members. However, such foils could also be used for bearing assemblies requiring an odd number of foil members. In the latter assemblies the foil members would be slightly skewed in the direction of the axis of the journal to be supported to enable interleaving of the strips of the end portions of the foil members. The degree of skew could be kept to a small value by utilization of strips of small width in the end portions of the foil members.

While I have shown particular embodiments of my invention, it will, of course, be understood that I do not wish to be limited thereto since many modifications may be made in the structural arrangement shown and the instrumentalities employed. I contemplate by the appended claims to cover any such modifications as fall within the true spirit and scope of the invention.

What I claim as new and desire to secure by Letters Patent of the United States is:

1. In combination,
   a rotatable shaft having a journal,
   a bearing means for supporting the journal of said shaft,
   a supporting structure surrounding said journal,
   said bearing means including a plurality of foil members, each foil member including a continuous central portion and a pair of end portions, said end portions being in the form of a plurality of spaced strips, the end portions of each member secured to respective circumferentially spaced pair of points on said support structure to form a continuous concave surface for supporting a respective portion of said journal, and
   said members spaced axially with respect to one another such that the strips of one end portion of one member and the spaces of a circumferentially adjacent end portion of another member are in axial registry whereby the strip portions of a member and the strip portions of a circumferentially adjacent member are interleaved.

2. The combination of claim 1 in which the continuous central portion of each foil engages substantially equal surface areas of said journal.

3. The combination of claim 2 in which the continuous central portion of each foil engages substantially equal surface areas of said journal and are equally spaced about said journal.

4. The combination of claim 1 in which the continuous central portion of each of said foil members are circumferentially supported so as to contact substantially the entire circumference of said journal.

5. The combination of claim 1 in which each of said strips is of the same width and each spaced from an adjacent strip by said width.

6. The combination of claim 5 in which the end portions of said members are identical.

7. The combination of claim 1 in which four foil members are provided.

8. The combination of claim 1 in which the strips in one end portion of a foil member are aligned with spaces in the other end portion of said foil member.

9. The combination of claim 8 in which said members are arranged about said supporting structure such that said one end portion of one member interleaves with said other end portion of another member.

10. The combination of claim 9 in which three foil members are provided.

References Cited

UNITED STATES PATENTS 3,434,761   3/1969   Marley _____ 308—9

MARTIN P. SCHWADRON, Primary Examiner

F. SUSKO, Assistant Examiner

U.S. Cl. X.R.

308—9, 121